(12) United States Patent
Grabner et al.

(10) Patent No.: US 8,427,027 B2
(45) Date of Patent: Apr. 23, 2013

(54) BRUSH UNIT FOR AN ELECTRIC MACHINE, SPRING AND SEAL ARRANGEMENT FOR THE SAME, AND METHOD FOR THE PRODUCTION THEREOF

(75) Inventors: Herbert Grabner, Bad Ischl (AT); Gerhard Limberger, Bad Goisern (AT)

(73) Assignee: Hoffmann & Co. Elektrokohle Aktiengessellschaft, Bad Goisern Am Hallstattersee (AT)

( * ) Notice: Subject to any disclaimer, the term of this patent is extended or adjusted under 35 U.S.C. 154(b) by 392 days.

(21) Appl. No.: 12/734,246

(22) PCT Filed: Dec. 5, 2008

(86) PCT No.: PCT/EP2008/010339
§ 371 (c)(1),
(2), (4) Date: Apr. 20, 2010

(87) PCT Pub. No.: WO2009/074269
PCT Pub. Date: Jun. 18, 2009

(65) Prior Publication Data
US 2010/0289360 A1    Nov. 18, 2010

(30) Foreign Application Priority Data
Dec. 11, 2007   (DE) .......................... 10 2007 059 555

(51) Int. Cl.
*H02K 5/14* (2006.01)
*H02K 13/10* (2006.01)
(52) U.S. Cl.
USPC .............................. 310/242; 310/85; 310/239
(58) Field of Classification Search ............... 310/85, 310/238, 239, 240, 242, 244, 245, 246; *H02K 5/14, H02K 5/22, 13/10*
See application file for complete search history.

(56) References Cited

U.S. PATENT DOCUMENTS

| | | | |
|---|---|---|---|
| 4,673,837 A | 6/1987 | Gingerich et al. | |
| 5,689,148 A | 11/1997 | Rubinchik | |
| 6,144,134 A | 11/2000 | Lin | |
| 7,709,994 B2 * | 5/2010 | Mantle | 310/242 |
| 2004/0195928 A1 * | 10/2004 | Skofljanec | 310/239 |
| 2006/0267445 A1 * | 11/2006 | Nedriga et al. | 310/242 |

FOREIGN PATENT DOCUMENTS

| | | |
|---|---|---|
| DE | 35 38 940 A1 | 5/1987 |
| DE | 88 07 881.7 U1 | 10/1989 |
| DE | 40 38 317 A1 | 6/1991 |
| DE | 42 32 692 A1 | 4/1993 |

(Continued)

*Primary Examiner* — Tran N. Nguyen
*Assistant Examiner* — Michael Andrews
(74) *Attorney, Agent, or Firm* — Alix, Yale & Ristas, LLP

(57) ABSTRACT

A brush unit for an electric machine has a simple and low-cost but robust design, and can be assembled at low-cost using simple process steps comprises four ring-shaped board elements are stacked on each other, namely two outer circuit boards, each of which is electrically conductively connected to one or more brushes. Two guide boards made of electrically insulative material disposed therebetween, comprise a shape having protrusions and recesses for forming radial guides for the brushes and receptacles for springs acting on the brushes. The springs are spiral springs wound around a mandrel, the flat ends thereof protruding past the springs being rotationally fixedly guided in a guide groove of each receptacle and able to engage behind a stop. In order to assemble the brush unit, the circuit and guide boards are stacked on each other in the axial direction and riveted, then the brushes are inserted in the guides in the radial direction and the springs are placed in the receptacles.

7 Claims, 7 Drawing Sheets

FOREIGN PATENT DOCUMENTS

| | | |
|---|---|---|
| DE | 42 26 553 A1 | 2/1994 |
| DE | 93 15 381 U1 | 2/1995 |
| DE | 199 38 342 A1 | 2/2000 |
| EP | 0 224 053 A | 6/1987 |
| EP | 0 343 126 A | 11/1989 |
| EP | 1 843 451 A | 10/2007 |
| FR | 2 582 872 A | 12/1986 |
| FR | 2 743 211 | 7/1997 |

\* cited by examiner

BRUSH UNIT FOR AN ELECTRIC MACHINE, SPRING AND SEAL ARRANGEMENT FOR THE SAME, AND METHOD FOR THE PRODUCTION THEREOF

BACKGROUND

The invention relates to a brush unit for electric machines. A preferred field of application of the brush unit is in electric motors for motor vehicles, in particular starter motors (starters) for internal combustion engines.

Higher requirements are increasingly being placed on starter motors (starters) in automobiles with respect to the service life and performance, these being created partly by the continuously increasing environmental requirements. One example of this is the start/stop function, which is already incorporated in many new vehicles for the purpose of saving fuel, in which the engine is automatically switched off when the vehicle is stationary and is automatically restarted in order to drive away. This leads to a higher loading on the starter motor and has to be counteracted by measures such as increasing the conductor cross section and/or increasing the number of brushes, as a result of which, however, the material costs are increased. This leads to efforts to counteract the higher material costs by reducing the assembly costs.

SUMMARY

A brush unit is proposed for electric machines which is of simple, more cost-effective construction and with which, in particular, the assembly process can be considerably simplified and therefore also made less expensive, but which equally also allows the use of an increased number of brushes, for example six brushes.

Briefly stated, a brush unit for an electric machine comprises four ring-like board elements stacked together and rigidly joined by fastening means. Two outer board elements of the stack are ring-like printed circuit boards which are electrically conductively connected to one or more brushes. Two guide boards comprise an electrically insulated material arranged between the printed circuit boards. The guide boards have a shape with projections and recesses on the sides which face one another. The projections form support faces for resting against corresponding support faces of the other guide board. The recesses in the guide boards complement one another in order to form radial guides into which the brushes, which are electrically connected to the printed circuit boards, are arranged in a radially displaceable manner.

The fastening means may be in the form of rivets which extend through the printed circuit boards and guide boards. Each of the printed circuit boards is connected to the two guide boards, but not to the other printed circuit board by the rivet. Each brush is mechanically and electrically connected to an associated printed circuit board by a flexible cable so that the brush can be inserted into the corresponding guide radially formed by the guide boards from an outside location after the printed circuit boards and guide boards are joined.

A spring arrangement on the brush unit comprises at least one radial guide for a brush and at least one receptacle for a spring which acts on the brush and is formed on a substantially ring-like base body. A spring is arranged in the receptacle. The spring is in the form of a helical spring, the outer end of which rests against the brush and the inner end of which is fastened to a mandrel. Two ends of the mandrel project beyond the helical spring and have a flattened cross-section. Slot-like guide grooves for the ends of the mandrel are formed in the upper and lower face of the receptacle. The slot-like guide grooves are radially opened toward the outside in such a way that the helical spring, together with the mandrel, can be radially inserted into the receptacle from the outside. In the process, the ends of the mandrel are guided in a slot-like guide or the groove guide in a rotationally fixed manner. The guide grooves each have a latching projection behind the ends of the mandrel latch when the spring is inserted into the receptacle and are fixed by the reaction force of the spring which rests against the brush.

Further advantageous refinements of the brush unit involve a spring and/or seal arrangement for the brush unit, and to a method for assembly of said brush unit.

BRIEF DESCRIPTION OF THE DRAWINGS

An embodiment of the brush unit and a method for the assembly of said brush unit are explained in greater detail below with reference to the drawings, in which.

DETAILED DESCRIPTION

Figure 1:
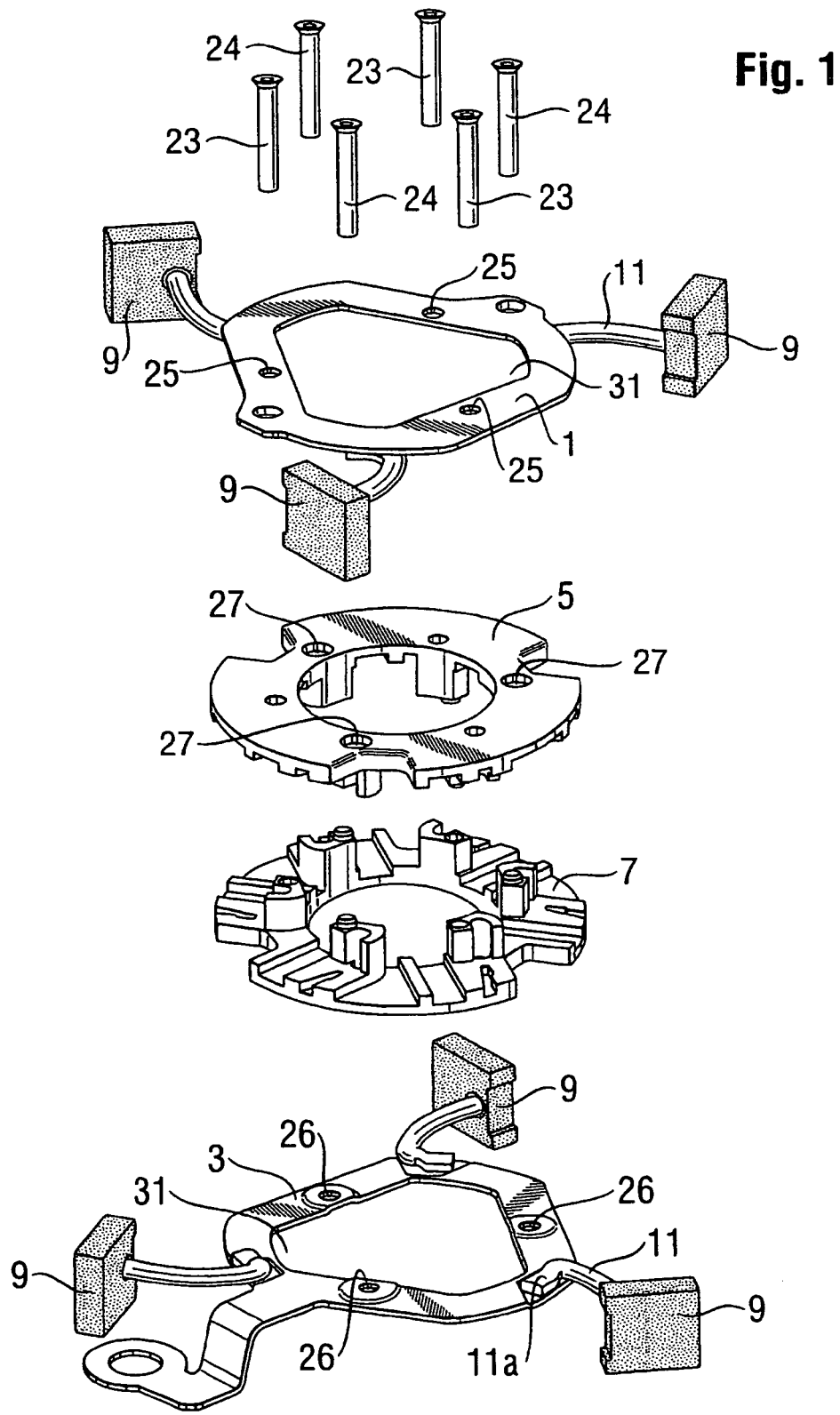
FIG. 1 shows, in a perspective manner, the main constituent parts of the brush unit before assembly.

According to FIG. 1, the holder construction of the brush unit comprises four ring-like board-like elements, specifically an upper and a lower printed circuit board 1, 3 which comprise a sheet metal with a suitable conductivity, and, arranged between said printed circuit boards, an upper and lower guide board 5, 7 which are formed from electrically insulating material, preferably in the form of an injection-molded plastic part. In the embodiment described here, the brush unit has, in particular, six brushes 9, in each case three of said six brushes being electrically conductively connected to the upper printed circuit board and three being electrically conductively connected to the lower printed circuit board. The connection is established in each case by means of a cable 11 which is fastened to the associated brush 9, preferably by being pressed in, and the other end 11a of which is welded to the respective printed circuit board 1, 3.

On their sides which face the printed circuit boards 1, 3, the guide boards 5, 7 are flat and, on their sides which face one another, have a shape with projections (raised areas) 13 and recesses, with the shapes of the two guide boards 5, 7 substantially forming a mirror image and being rotationally identical with respect to one another.

Figure 2:
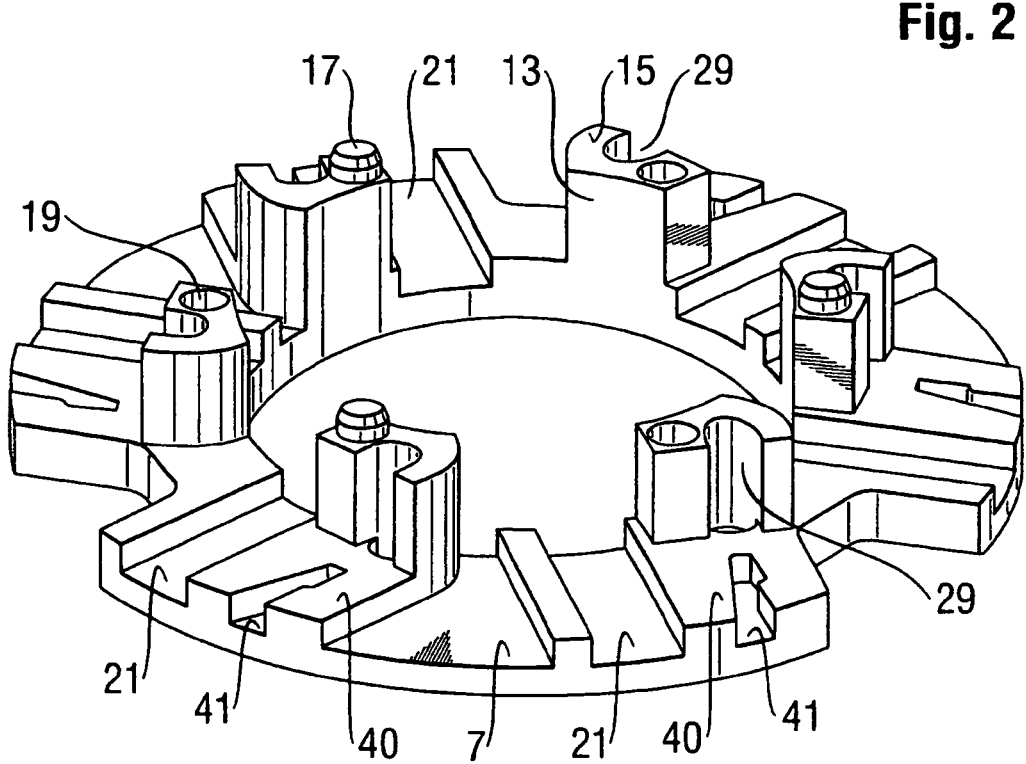
FIG. 2 shows a perspective view of one of the two guide boards.

As can be seen from the individual illustration of the lower guide board 7 in FIG. 2, which is somewhat magnified compared to FIG. 1, the projections 13 have upper support faces 15. The support faces 15 come to rest against the corresponding support faces of the upper guide board 5 when the guide boards 5, 7 are joined, and therefore the guide boards 5, 7 are supported against one another by way of the projections 13. The projections 13 are alternately provided with positioning pins 17 and positioning holes 19 which engage with the corresponding pins and holes in the upper guide board 5, in order to center and position (index) the guide boards in the correct angular position with respect to one another. The guide boards 5, 7 form a mirror image and are rotationally identical with respect to one another and can preferably be of identical shape, this simplifying the production of the brush units. The printed circuit boards 1, 3 are also formed largely with mirror-image symmetry with respect to one another, apart from function-related deviations from the mirror-image symmetry, for example the presence of a connection lug 45, which projects integrally from the lower printed circuit board 3, for a connection cable (not illustrated).

Between the projections 13, the shape of the lower guide 7 has recesses in the form of radially continuous guide grooves 21. Said guide grooves are complemented by the corresponding guide grooves in the upper guide board 5 in order to form radial guides into which the brushes 9 can be inserted in a radially displaceable manner and guided. A receptacle 40 for a spring which acts on the brush is provided alongside each guide groove 21 and associated with said guide groove; the design and function of said receptacle will be described below.

In order to assemble the brush unit, the printed circuit boards 1, 3 and guide boards 5, 7 are stacked one on the other in the order illustrated in FIG. 1 and are joined by connecting elements, in the present case six rivets 23, 24, so that they form a rigidly joined ring-like block.

In order to allow the rivets 23, 24 to pass through, holes 25, 26 are provided in the printed circuit boards 1, 3, and each of the guide boards 5, 7 also has corresponding holes 27 and, in a continuation of said holes, semicircular cutouts 29 on that side of each projection 13 which is directed toward the outside.

In the illustrated embodiment with six brushes 9, the rivets are arranged such that each of the printed circuit boards (for example 1) has only three holes 25 for receiving three rivets 23, and otherwise has an approximately triangular shape which forms three convex areas 31 which provide space for the remaining three rivets 24. Therefore, when the constituent parts are joined, three rivets 23, that is to say each second rivet, extends through holes 25 in the upper printed circuit board 1 and holes 27 in the two guide boards 5, 7 and connect said upper printed circuit board and guide boards to one another, whereas the other three rivets 24 extend through holes 27 in the two guide boards 5, 7 and holes 26 in the lower printed circuit board 3 and connect said guide boards and lower printed circuit board to one another in a non-releasable manner. Each printed circuit board 1 or 3 is therefore connected to the two guide boards 5, 7, but not to the other printed circuit board 3 or 1, by three rivets. This arrangement of the rivets prevents the rivets being in electrical contact with the upper and lower printed circuit boards 1, 3 at the same time and short-circuiting said printed circuit boards. A conductive connection between the printed circuit boards 1, 3 is avoided in this way without the use of additional insulating bushings or the like which insulate the rivets from the printed circuit boards 1, 3.

After the four board-like elements 1, 3, 5 and 7 are joined, the brushes can be pushed into the guides, which are formed by the guide grooves 21 of the guide boards 5, 7, radially from the outside. Since the brushes 9 are already connected to the associated printed circuit board 1 or 3 in a non-releasable manner by means of the cable 11, the length and flexibility of the cables 11 has to be selected such that it is possible to insert the brushes 9 into the guides.

Figure 4:
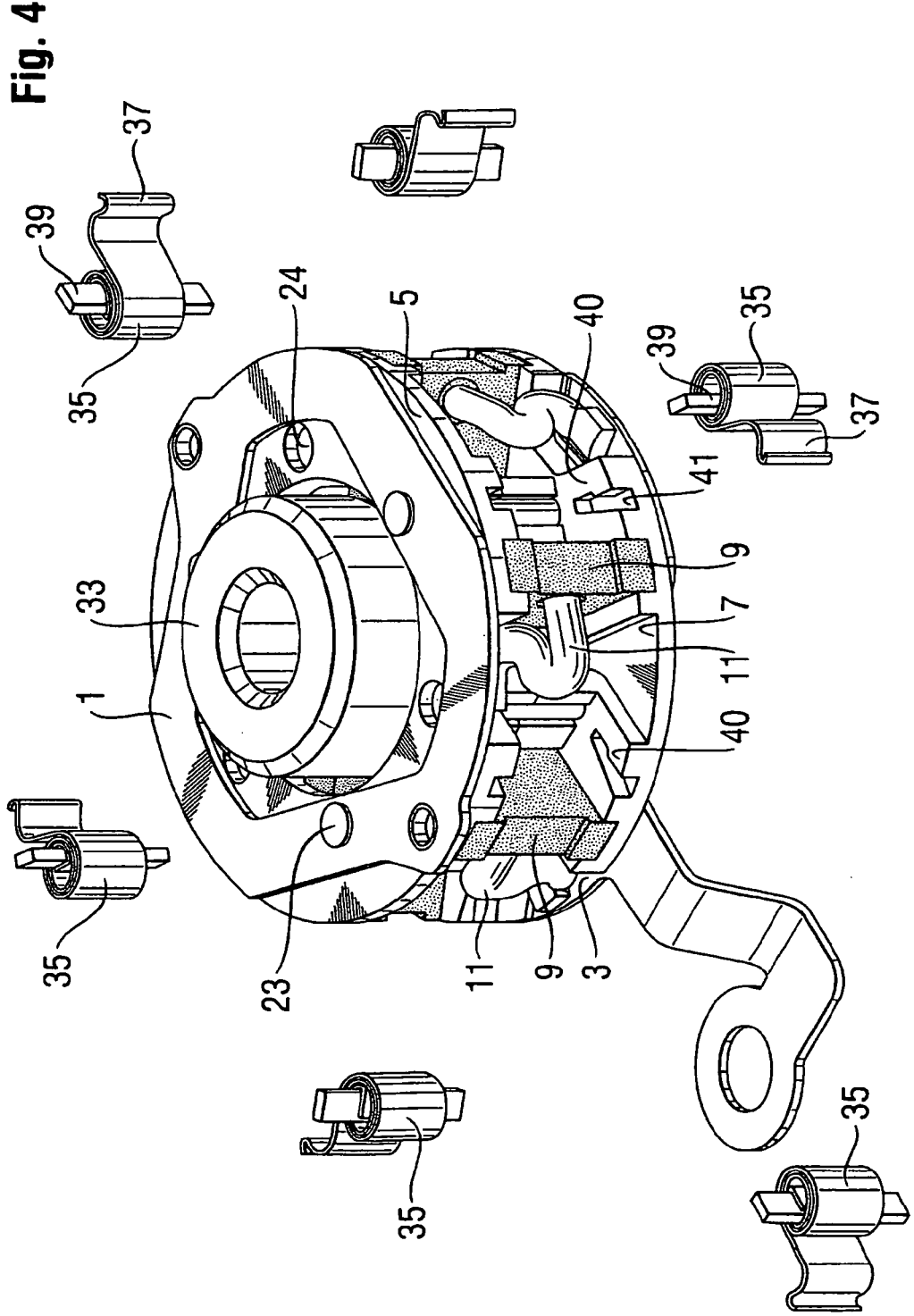
FIG. 4 shows the brush unit in a partially assembled state with springs yet to be inserted.

The intermediate state of the brush unit illustrated in FIG. 4 is obtained after the parts are riveted and the brushes 9 are pushed into the guides.

FIG. 4 also shows a cylindrical filling body 33 (jig, dummy), the diameter of said cylindrical filling body being equal to or slightly greater than that of the commutator or collector for which the brush unit is provided. Said dummy serves as a jig during assembly and for transportation and serves as a radially inner stop for the displaceable spring-loaded brushes 9 and defines the end position of said brushes in the respective radial guide 21.

In order to complete the brush unit and make it functional, springs still have to be fitted, these springs having the purpose of pressing the brushes radially inward toward the associated cylindrical commutator or collector of an electric machine. As shown in FIG. 4, the springs 35 which are to be associated with the brushes 9 are in the form of helical springs wound from a strip of spring steel. The outer end 37 of said helical springs, which outer end is bent in a groove-like manner, is intended to rest against that end face of the associated brush 9 which is directed radially outward. The inner end of the helical spring 35 is fastened, in particular welded, to a mandrel or winding core 39 which has a flat rectangular cross section and of which the ends, which are therefore likewise flattened, project beyond the helical springs 35 on both sides. Each of these springs 35 is inserted into an associated receptacle 40 which is in each case formed alongside an associated brush in the guide board 5, 7 and, at its upper and lower end face, has a respective guide groove 41 for receiving the upper or lower end of the winding core 39 of the spring 35.

Figure 5:
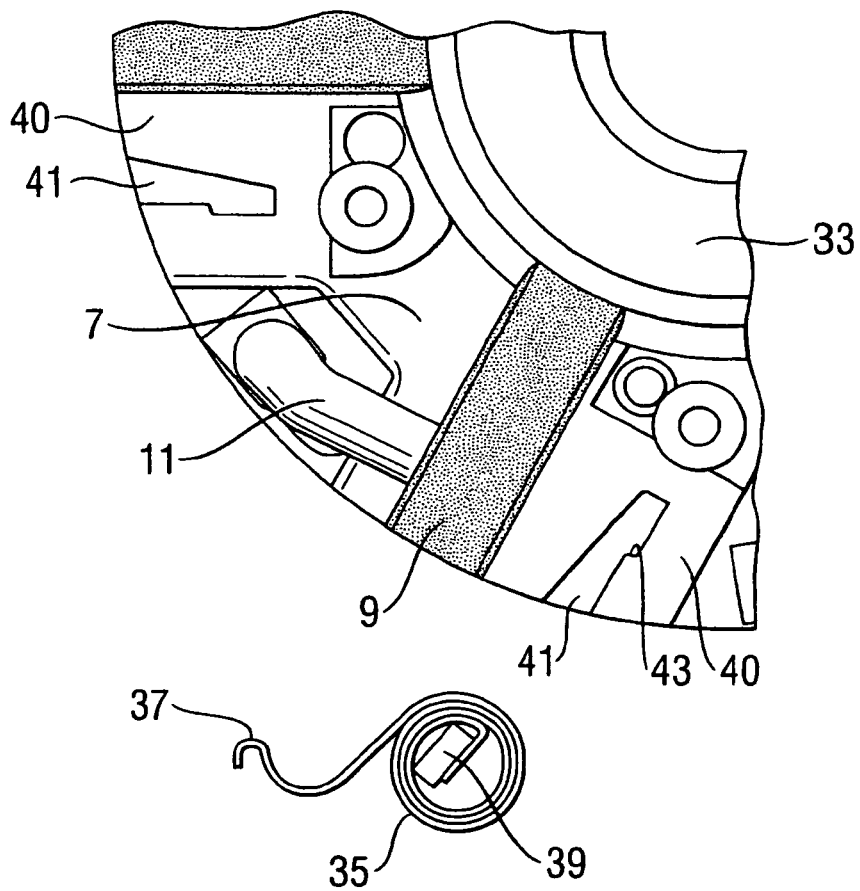
FIGS. 5, 6 and 7 illustrate the insertion of a brush spring into its receptacle.
Figure 6:
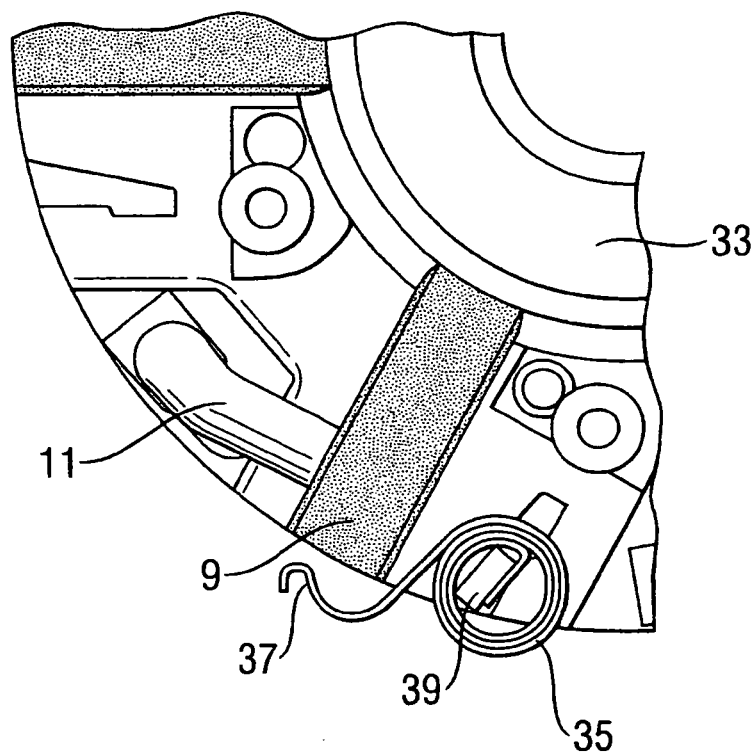
Figure 7:
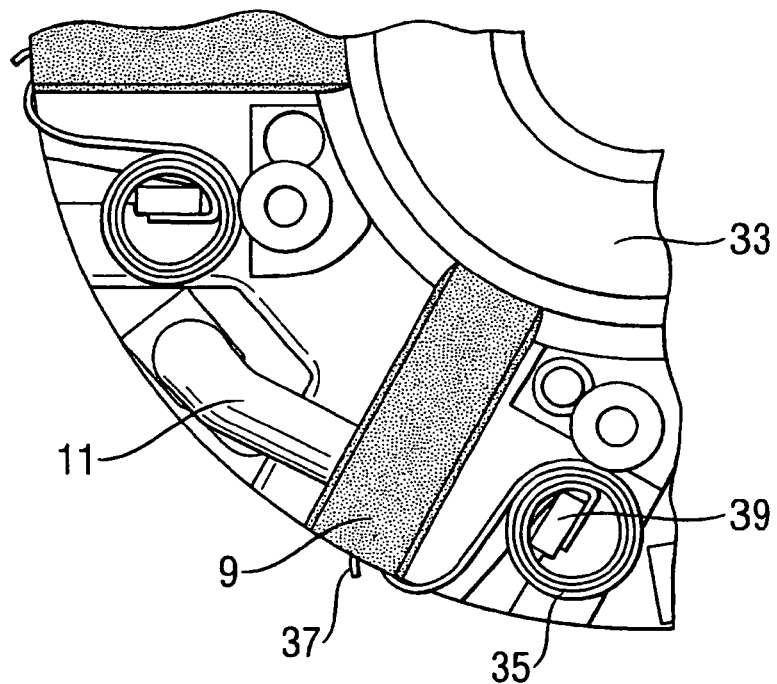

FIGS. 5, 6 and 7 show a detail of a plan view of the lower guide board 7 on a magnified scale and explain the insertion of a spring 35 into a receptacle 40 which is associated with a brush 9. FIG. 5 shows the spring 35 on its winding core 39 before insertion. In FIG. 6 the spring 35 is partially inserted, with the ends of the winding core 39 being guided in the initial portion of the upper and lower guide groove 41. Once the free end 37 of the spring 35 comes to rest against the outer end face of the brush 9, the spring 35 is pushed in still further, with said spring firstly being prestressed and secondly the winding core 39 of said spring passing an inwardly projecting latching tab 43 of the guide groove 41. Since the free end 37 of the spring 35 presses against the brush 9, a reaction force acts on the spring and the angle core 39 which is fastened to the inner end of said spring, said reaction force exerting a torque (in the counterclockwise direction in FIGS. 5 to 7) on the inner end of the spring and on the winding core 39 which is fastened to it, said torque causing the winding core 39 to latch behind the latching tab 43. As a result, the spring 35 has reached its end position and is fixed in this position by its inherent reaction force.

After the insertion of the springs, the brush unit is substantially completely assembled. The lower printed circuit board 3 has a radially protruding current connection lug 45, it being possible for the end of said current connection lug to be connected to a power supply cable. (The upper printed circuit board 1 has a connection (not illustrated) to ground). When the brush unit is installed in a starter motor, the connection lug 45 has to extend through the wall (not illustrated) of the motor housing and be sealed off from said wall by a seal element. According to FIG. 3, which shows the assembled end state of the brush unit, a seal element 47 comprising elastomeric material is provided for this purpose, the special feature of said seal element being that it has a slot 49 which runs in the transverse direction, is open at one end and allows the seal element 47 to be pushed laterally onto the connection lug 45, that is to say in the tangential direction with respect to the brush unit. Therefore, time-consuming and laborious attachment in the radial direction, and also the exertion of radial forces which can lead to deformation of the printed circuit board 3 and the connection lug 45, is avoided. As a result, it is also possible to realize the current connection in the form of a simple connection lug which is integral with the lower printed circuit board 3 without a cable or cable shoe.

Figure 3:
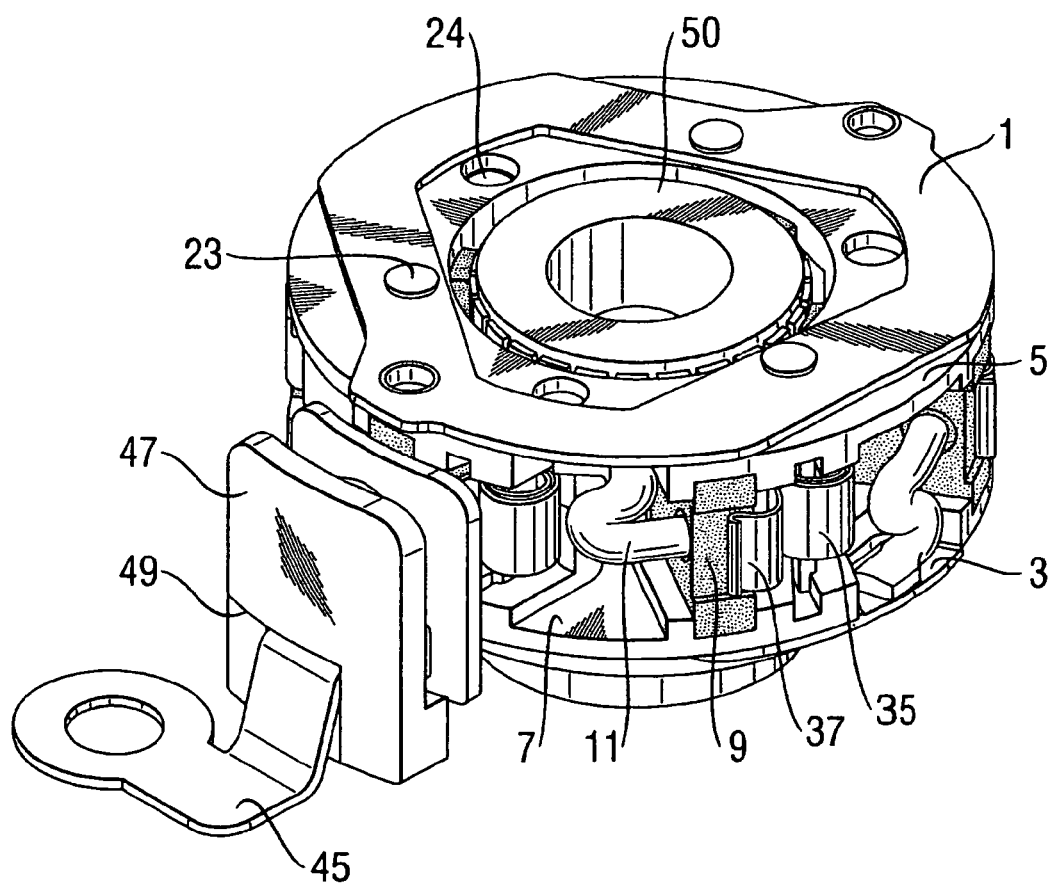
FIG. 3 shows a perspective view of the brush unit in its completely assembled state.

FIG. 3 does not illustrate the completely assembled brush unit with the jig 33 (dummy) used for assembly and transportation, but already with a commutator 50 against which the radially inner ends of the brushes are intended to rest in an abrasive manner.

It can be seen that the described assembly process for the brush assembly substantially comprises three phases, specifically a. axial assembly by stacking the printed circuit boards and guide boards 1, 5, 7 and 3 one on the other and joining said printed circuit boards and guide boards by means of the axially inserted rivets 23, 24, it being possible to simultaneously rivet all the rivets in one working step;

b. radial assembly by radially inserting the brushes 9 into the associated guides 21 and then radially inserting the springs 35, together with their winding cores 39, into the corresponding receptacles 40 and guide grooves 41, it being possible to radially insert all six springs 35 at the same time;

c. tangential assembly by pushing the laterally slit seal element 47 onto the connection lug 45 in the tangential direction.

This produces a very simplified and cost-effective assembly process for the brush unit overall. In particular, radially joining the helical springs 35 provides the following advantages: no or only little prestressing of the springs 35 is necessary before insertion; the radial movement into the receptacles 40 which are open radially toward the outside provides good accessibility; there is a high degree of tolerance with respect to the brush position in the radial direction before the insertion of the springs. The flat winding cores 39 of the springs 35 automatically latch behind the latching tabs 43 of the guide grooves 41 in the upper and lower guide boards on account of the reaction forces of the springs when the end position is reached. In any case, the reaction force of the winding cores 37 of the springs further increases the rigidity of the entire unit, in addition to the positioning pins 17 and rivets 23, 24.

The invention is not restricted to the details of the illustrated embodiment. Although a brush unit with six brushes has been illustrated and described as a preferred embodiment, the invention can be used independently of the number of brushes, at least even with a single brush. Rivets have been described as the connecting elements for joining the printed circuit boards and guide boards, but other connecting elements such as screws, clips or else an adhesive bond can be used as alternatives or in addition.

The invention claimed is:

1. A brush unit for an electric machine, which comprises:
    four ring-like board elements stacked together and including two outer board elements and two inner board elements which are rigidly joined by fastening means;
    wherein the two outer board elements are ring-like printed circuit boards which are electrically connected to one or more brushes;
    wherein the two inner are board elements are ring-like guide boards made of an electrically insulating material and are arranged between the printed circuit boards, said guide boards having projections and recesses on the sides which face one another, with the projections forming support faces for resting against corresponding support faces of the other guide board; and
    wherein the recesses in the guide boards complement one another in order to form radial guides into which the brushes, which are electrically connected to the printed circuit boards, are arranged in a radially displaceable manner.

2. The brush unit as claimed in claim 1, in which the fastening means are in the form of rivets which extend through the printed circuit boards and guide boards.

3. The brush unit as claimed in claim 2, in which each of the printed circuit boards is connected to the two guide boards, but not to the other printed circuit board, by rivets.

4. A seal arrangement for a brush unit for the electric machine of claim 2, having a current connection lug which protrudes radially from a printed circuit board of the brush unit, and a rubber-elastic seal element which can be pushed onto the connection lug, with the seal element having a slot which is open to one side and by means of which slot said seal element can be pushed onto the current connection lug in a direction which is tangential with respect to the ring-like brush unit.

5. A seal arrangement for a brush unit for the electric machine of claim 3, having a current connection lug which protrudes radially from a printed circuit board of the brush unit, and a rubber-elastic seal element which can be pushed onto the connection lug, with the seal element having a slot which is open to one side and by means of which slot said seal element can be pushed onto the current connection lug in a direction which is tangential with respect to the ring-like brush unit.

6. The brush unit as claimed in claim 1, in which each brush is mechanically and electrically connected to an associated printed circuit board by a flexible cable, having flexibility and a length such that the brush can be inserted into the corresponding guide, which is formed by the guide boards, radially from an outside location after the printed circuit boards and guide boards are joined.

7. A seal arrangement for a brush unit for an electric machine of claim 1, having a current connection lug which protrudes radially from a printed circuit board of the brush unit, and a rubber-elastic seal element which can be pushed onto the connection lug, with the seal element having a slot which is open to one side and by means of which slot said seal element can be pushed onto the current connection lug in a direction which is tangential with respect to the ring-like brush unit.

* * * * *

UNITED STATES PATENT AND TRADEMARK OFFICE
CERTIFICATE OF CORRECTION

PATENT NO. : 8,427,027 B2  Page 1 of 1
APPLICATION NO. : 12/734246
DATED : April 23, 2013
INVENTOR(S) : Grabner et al.

It is certified that error appears in the above-identified patent and that said Letters Patent is hereby corrected as shown below:

On the Title Page

Item [73] Assignee:, delete "Hoffmann & Co. Elektrokohle Aktiengessellschaft" and insert
--Hoffmann & Co. Elektrokohle Aktiengesellschaft--

Signed and Sealed this
Third Day of September, 2013

Teresa Stanek Rea
*Acting Director of the United States Patent and Trademark Office*